United States Patent [19]

Gesenhues et al.

[11] Patent Number: 5,397,274
[45] Date of Patent: Mar. 14, 1995

[54] PISTON ENGINE OR MACHINE

[75] Inventors: Bernhard Gesenhues, Birkenau; Detlef Cordts, Mörlenbach, both of Germany

[73] Assignee: Firma Carl Freudenberg, Weinheim, Germany

[21] Appl. No.: 170,462

[22] Filed: Dec. 20, 1993

[30] Foreign Application Priority Data

Dec. 19, 1992 [DE] Germany ............... 42 43 168.9

[51] Int. Cl.$^6$ ................................. F16H 57/00
[52] U.S. Cl. ................................. 474/144; 474/146
[58] Field of Search ................... 474/144–147, 474/140

[56] References Cited

U.S. PATENT DOCUMENTS

| | | | |
|---|---|---|---|
| 2,202,878 | 6/1940 | Tautz | 474/146 |
| 3,811,340 | 5/1974 | Morse | 474/146 X |
| 3,927,578 | 12/1975 | Mattila | 474/146 X |
| 4,425,105 | 1/1984 | Edl et al. | 474/140 |
| 4,708,699 | 11/1987 | Takano et al. | 474/144 |
| 4,723,619 | 2/1988 | Yamamoto et al. | 474/144 X |
| 4,908,008 | 3/1990 | Gorski | 474/146 |
| 5,041,062 | 8/1991 | Dornhoff | 474/144 |

*Primary Examiner*—Michael Powell Buiz
*Attorney, Agent, or Firm*—Kenyon & Kenyon

[57] ABSTRACT

A piston engine or machine with a belt drive which is surrounded by a housing, with the housing substantially sealing off the belt drive from the environment and from the piston engine or machine, is provided. The housing may have Helmholtz resonators facing the belt drive.

14 Claims, 1 Drawing Sheet

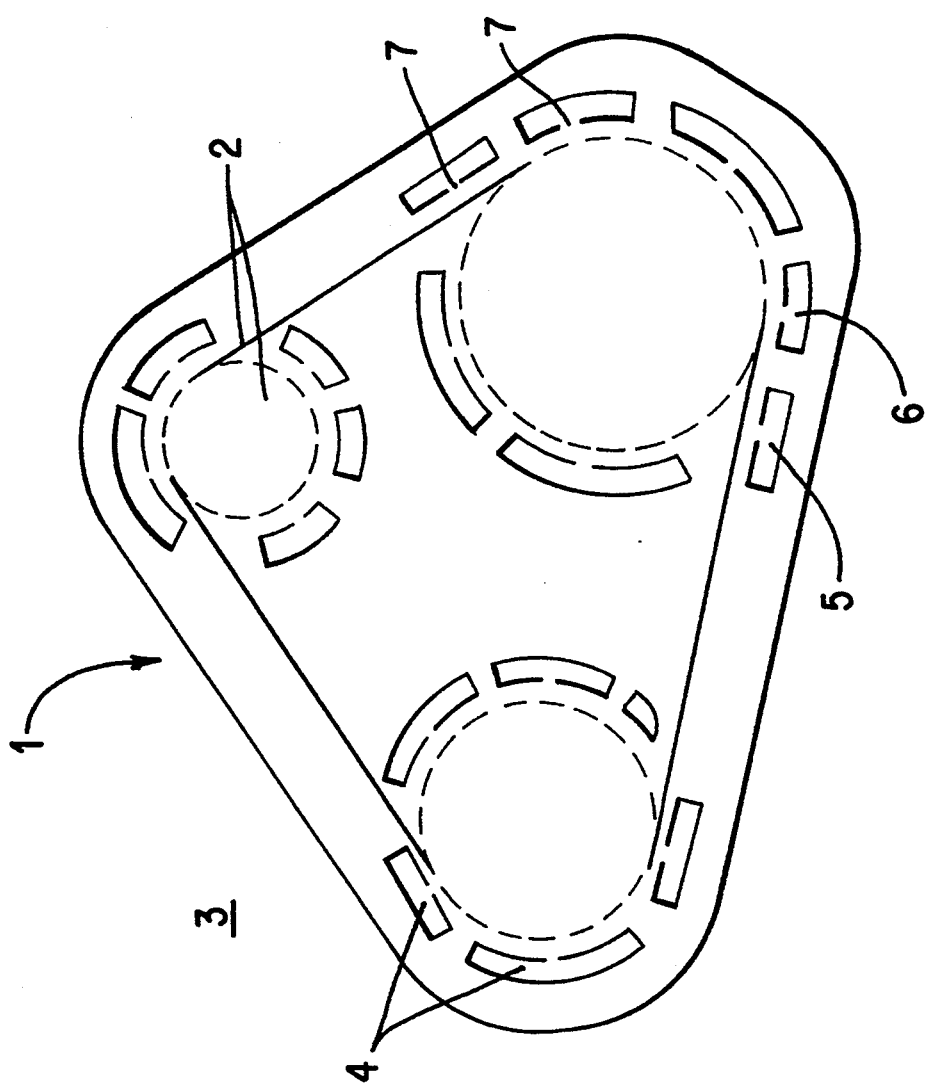

PISTON ENGINE OR MACHINE

FIELD OF THE INVENTION

The invention relates generally to a piston engine or other machine and more particularly to a piston engine or machine with a belt drive surrounded by a housing.

BACKGROUND OF THE INVENTION

Belt drives are generally known and are used for example in motor vehicle engines to control accessories and/or to control the camshaft. The housing partially surrounding the belt drive in these cases is usually made of a polymer provided with stiffening ribs on the side facing the belt drive. The housing protects the belt drive against contamination and protects the environment against contact with the rotating components. However it is necessary to keep in mind that significant reduction of noise produced by the belt drive cannot be achieved by known housings.

SUMMARY AND ADVANTAGES OF THE INVENTION

An object of the present invention is to reduce the operating noise of the belt drive through sound absorption.

The present invention therefore provides a machine comprising a belt drive and a housing surrounding the belt drive, the housing substantially sealing off the belt drive from the environment and the machine.

The housing surrounding the belt drive largely seals the belt drive off from the environment and from the piston engine or other machine. The belt of the belt drive is excited to bending oscillations during its operation.

Both the bending oscillations and the engagement sound that results as the belt rolls over the pulley cause undesirable noises. The exciting frequencies that cause the noise are limited to a certain frequency range in the vicinity of the belt drive. At least extensive sealing of the housing from the environment and from the machine produces a considerable noise reduction. The better the housing is sealed, the more efficient the noise reduction will be.

In conjunction with simple and economically advantageous manufacturability, one advantageous embodiment provides that the housing is made of deep-drawn plastic film. The plastic film is preferably made self-supporting, so that it does not require the use of a supporting member. The plastic film can be stiffened in a dimensionally stable fashion by ribs, for example on the side facing the belt drive.

The housing can be provided internally at at least one point with a Helmholtz resonator. The Helmholtz resonators are tuned and designed so that each one absorbs the sound striking it through an opening facing the sound source.

The Helmholtz resonators for example can be made from a deep-drawn plastic film which is then mounted on the housing. The two films (the housing and Helmholtz resonator film) can be fastened by clips, gluing, or welding, for example.

It is alternatively especially advantageous to provide the housing parts with additional ribs so that the chambers and openings required for the Helmholtz resonators are produced automatically when the parts are assembled, for example when an inner film is placed over the ribs located on the outer film. This limits the number of parts used and keeps the cost of assembly to a minimum. The housing can then be made in two shells for example. The space available in the present covering is therefore used as an absorbing element.

As far as good reusability and good manufacturing are concerned, both the housing and the Helmholtz resonator parts can be made of a homogeneous material.

The configurations described above allow for several Helmholtz resonators which differ from one another in volume, the hole radius facing the sound source, and/or neck length, in order to produce improved sound absorption over a wide frequency range. The double-walled design of the housing, with an inner film having Helmholtz resonators and an essentially smooth outer film, provides additional stiffness for the housing.

The Helmholtz resonators can comprise at least two resonators of different depths. Since Helmholtz resonators of different designs have different effective ranges, with Helmholtz resonators for absorbing low-frequency vibrations having a greater range of effectiveness than Helmholtz resonators absorbing high-frequency oscillations, Helmholtz resonators effective for low-frequency vibrations which are adjacent should be provided with different resonant frequencies.

Especially good absorption properties can be achieved when the surface of the housing facing the sound is covered with a plurality of Helmholtz resonators of different kinds in order to achieve optimum acoustic effectiveness in the available space.

BRIEF DESCRIPTION OF THE DRAWING

The subject of the invention will be described in greater detail with reference to the following drawing:

FIG. 1 shows a schematic representation of an engine with a belt drive surrounded by a housing.

DETAILED DESCRIPTION

In the embodiment shown, a housing 1 for a belt drive of an engine 2 is shown which is sealed off from environment 3 during the operation of the engine. Housing 1 is made double-walled and self-supporting.

Both housing parts are made of a polymer and are glued together in this embodiment. The outer part is designed as a cover, while the inner part is provided with convexities designed as Helmholtz resonators 4. The Helmholtz resonators are shown schematically as being unconnected, but it is understood that they may be attached to form the inner wall of the housing. On the side facing the sound, Helmholtz resonators 4 each have at least one hole 7 while Helmholtz resonators 4 are positioned essentially circularly around a belt pulley (including Helmholtz resonators extending inside the belt from a side). In order effectively to absorb different sound frequency ranges, Helmholtz resonators 4 have different dimensions. For example, Helmholtz resonators 5 and 6 are shown which have different depths.

Engagement sounds from the belt as it rolls on the pulley and noises caused by bending oscillations in the belt can be largely absorbed by housing 1 according to the invention. It is easily possible to tune housing 1 to several frequencies. The double-walled design of housing 1 makes supporting ribs largely unnecessary since sufficient stiffness is provided by the double-walled construction.

While the present invention has been disclosed with respect to the above-described embodiment, it is contemplated that other embodiments may fall within the scope of the present invention.

What is claimed is:

1. A machine comprising:
   a belt drive; and
   a housing surrounding the belt drive, the housing substantially sealing off the belt drive from the environment and the machine, the housing provided internally with at least one Helmholtz resonator.

2. The machine as recited in claim 1 wherein the Helmholtz resonator is made from a deep-drawn plastic film.

3. The machine as recited in claim 1 wherein at least two Helmholtz resonators of different sizes are provided.

4. The machine as recited in claim 3 wherein at least two Helmholtz resonators have different depths.

5. The machine as recited in claim 1 wherein the housing comprises an inner film and an outer film.

6. The machine as recited in claim 5 wherein the inner film has at least one Helmholtz resonator.

7. The machine as recited in claim 5 wherein the inner film and outer film together form at least one Helmholtz resonator.

8. A housing for a belt drive of a machine wherein the housing substantially seals off the belt drive from the environment and the machine, the housing provided internally with at least one Helmholtz resonator.

9. The housing as recited in claim 8 wherein the Helmholtz resonator is made from a deep-drawn plastic film.

10. The housing as recited in claim 8 wherein at least two Helmholtz resonators of different sizes are provided.

11. The housing as recited in claim 10 wherein at least two Helmholtz resonators have different depths.

12. The machine as recited in claim 8 wherein the housing comprises an inner film and an outer film.

13. The machine as recited in claim 12 wherein the inner film has at least one Helmholtz resonator.

14. The machine as recited in claim 12 wherein the inner film and outer film together form at least one Helmholtz resonator.

* * * * *